No. 896,848. PATENTED AUG. 25, 1908.
G. M. MILLS.
DASHER FOR LIQUID FREEZERS.
APPLICATION FILED SEPT. 14, 1906. RENEWED FEB. 13, 1908.
2 SHEETS—SHEET 2.
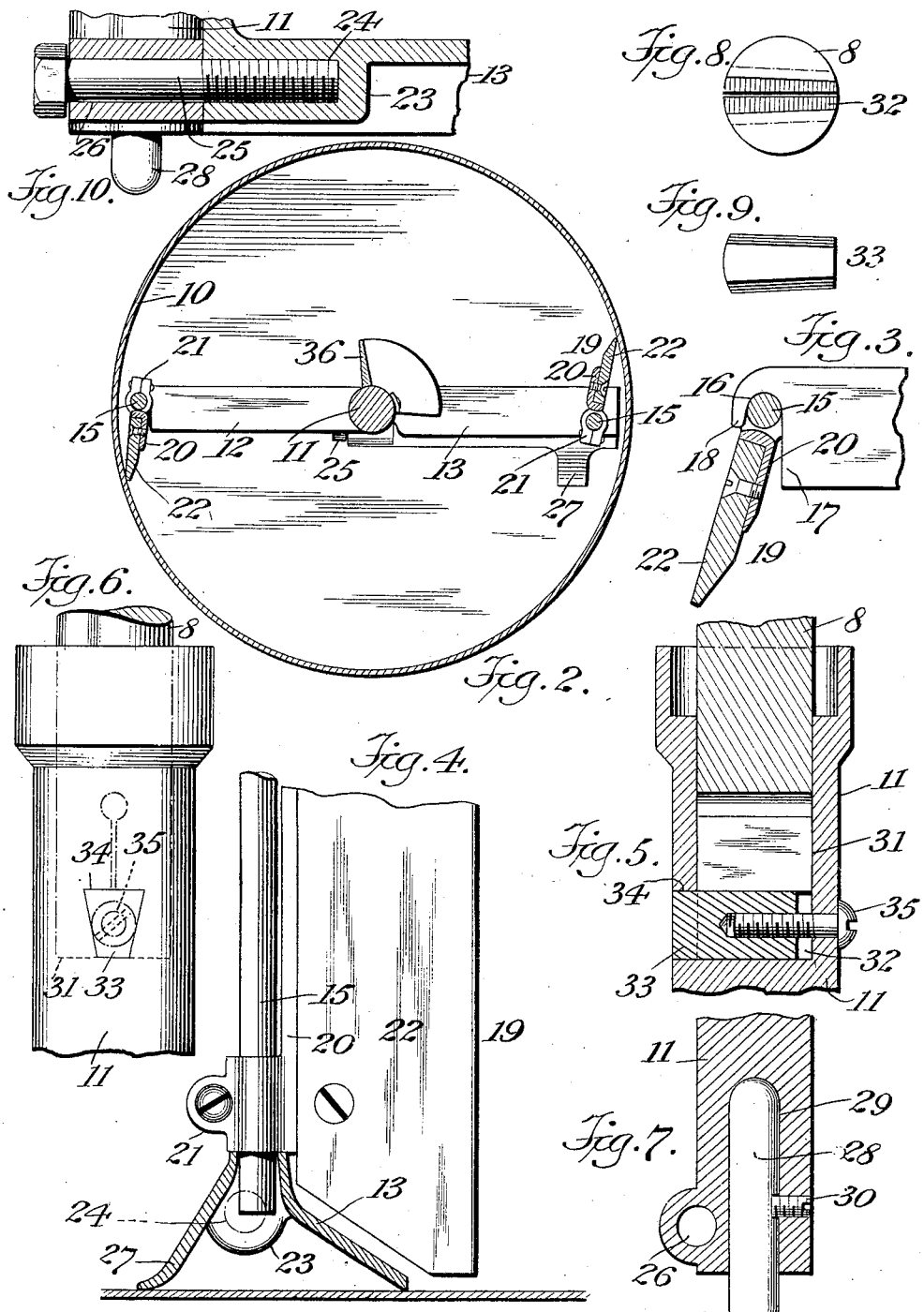

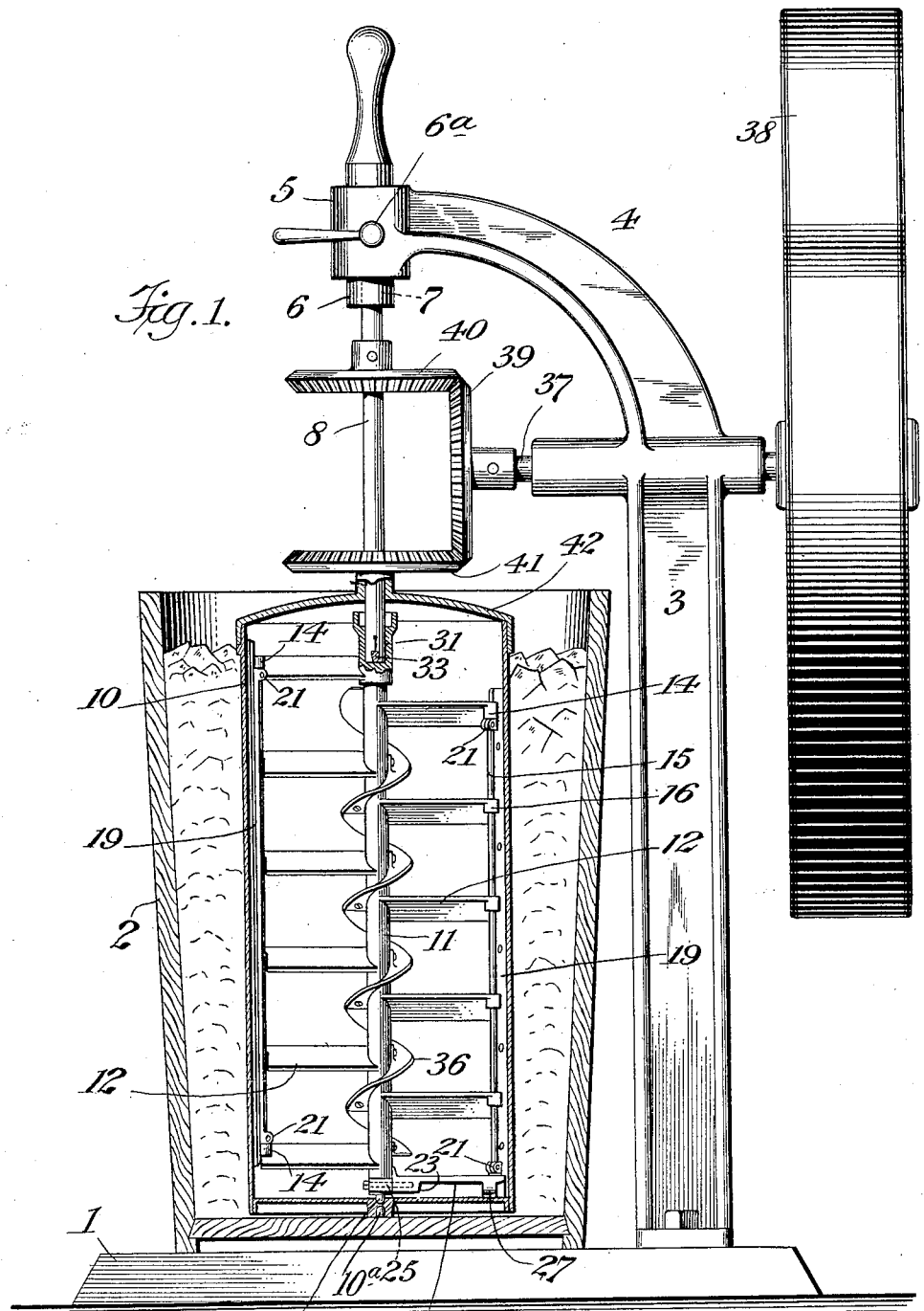

UNITED STATES PATENT OFFICE.

GEORGE M. MILLS, OF JERSEY CITY, NEW JERSEY.

DASHER FOR LIQUID-FREEZERS.

No. 896,848.      Specification of Letters Patent.      Patented Aug. 25, 1908.

Application filed September 14, 1906, Serial No. 334,577. Renewed February 13, 1908. Serial No. 415,765.

*To all whom it may concern:*

Be it known that I, GEORGE M. MILLS, a citizen of the United States, and resident of Jersey City, in the county of Hudson and State of New Jersey, have invented certain new and useful Improvements in Dashers for Liquid-Freezers, of which the following is a specification.

My invention relates to liquid freezers and particularly to improvements in dashers therefor.

It has for its object to form the driving shaft of the dasher and the pivot pin which take all the wear, separate from the stem which carries the blades and to provide means for removably attaching said parts, whereby said shaft and pin may be made of harder material than the stem and blades and when they become worn may be removed for the purpose of substituting new parts, thereby obviating the necessity and expense of substituting an entirely new dasher.

It has for a further object to provide vertical and laterally extending scraper blades for the dasher, whereby a yielding contact may be sustained between said blades and the bottom and side walls allowing the scrapers to ride over any dents or uneven places in the can and allowing the dasher to be readily adjusted in place or removed.

It has for a further object to provide the vertical scrapers with wooden strips, whereby the wear of the can by contact therewith is greatly lessened.

It has for a further object to provide a spiral conveyer surrounding the stem and adapted to cause a continuous circulation of the material to be frozen, downwardly in the center of the can and upwardly around the sides, thereby thoroughly freezing the material.

It has for a still further object to provide a device of the character set forth embodying advantages in point of perfect operation, strength, simplicity and inexpensiveness of construction.

In the drawings:—Figure 1 is a vertical sectional view showing my dasher applied in a freezer. Fig. 2 a horizontal sectional view through the can and dasher of the freezer, the tub being removed. Fig. 3 a fragmentary view partly in section, showing the hooked end of one of the fixed blades and a vertical scraper therein. Fig. 4 a fragmentary detail view partly in section, showing the bottom scraper, the lower end of one of the vertical scrapers and the lower end of the rod on which the vertical scraper is mounted. Fig. 5 a fragmentary detail view partly in section, showing the means for removably connecting the driving shaft to the upper end of the stem of the dasher. Fig. 6 a fragmentary detail elevation showing the means for removably connecting the driving shaft to the upper end of the stem of the dasher. Fig. 7 a fragmentary detail sectional view showing the means for removably securing the pivot pin to the lower end of the stem of the dasher. Fig. 8 an end view of the driving shaft of the dasher. Fig. 9 a bottom plan view of the key. Fig. 10 a fragmentary detail sectional view, showing the manner of journaling the bottom scraper in the stem of the dasher.

Like reference characters designate corresponding parts in all the figures of the drawings illustrating my invention.

Referring to the drawings 1 designates a base on which the tub 2 rests, said base being specially provided if it is desired to make the freezer and its operating mechanism easily transportable, but if not the floor of a house may constitute the base. To this base, adjacent the tub is secured a standard 3 having a goose-neck 4 provided on its upper end with a sleeve 5 having a smooth vertical bore in which a plug 6 is adjustably secured by means of a screw $6^a$ extending through a threaded hole in the sleeve into engagement therewith, said plug having a recess 7 in its lower end adapted to receive the upper end of the driving shaft 8 of the dasher and form a journal therefor, the lower journal for the pivot pin of the dasher being formed in the upper face of the bottom of the can 10 and the journal for the pivot $10^a$ of the cam being formed in a boss on the under face of the bottom of the can.

The dasher above referred to, which forms the subject of my invention, embodies a stem 11 having laterally extending inclined fixed blades 12 on opposite sides bearing staggered relation to one another and a reciprocatory scraper blade 13 on one side at the bottom, the upper and lower blades on each side having bearings 14 on their ends receiving the ends of rods 15 and the intermediate blades having hooked bearings 16 on their ends also receiving said rods, the inner faces 17 of the blades and the ends 18 of the hooks constituting abutments to limit the movement of the reciprocatory vertical scraper blades 19. These blades 19 consist of plates 20 having clamps 21 embracing the rods 15 and wooden strips 22 secured thereto and adapted to bear against the walls of the can, whereby the blades are allowed to ride over any uneven places in the walls of the can, are easily drawn inwardly when it is desired to remove the dasher and the wear of the can from contact therewith is greatly lessened.

The blade 13 has a boss 23 provided with a threaded socket 24 adapted to receive the threaded end of a bolt 25 which passes through a bearing 26 formed on one side of the stem and forms the journal of the blade and said blade also has a foot 27 adapted to bear on the bottom of the can and thereby relieve the journal of strain.

The pivot of the dasher consists of a reversible ended pin 28 which is inserted in a socket 29 in the lower end of the stem and secured therein by a screw 30 inserted through said stem into engagement therewith, whereby a pivot of harder material than the stem may be employed and it may be reversed end for end to allow for wear.

For the purpose of removably securing the driving shaft to the stem, a socket 31 is formed in said stem into which said shaft is inserted and the end of this shaft is split and provided with a wedge shaped tapered hole 32 to receive a wedge shaped tapered key 33 inserted therein through a wedge shaped hole 34 in the stem and secured by a screw 35 inserted through a hole in the stem into a threaded hole in said key.

The dasher is provided with a conveyer for forcing the material to be frozen downwardly at the center of the can as it is brought up by the laterally extending blades, said conveyer embodying a spiral fin 36 extending around the stem between said blades, the portions thereof between the blades being inclined in the opposite direction to the blades between which they extend.

The freezer is operated by means of a shaft 37 journaled in the goose-neck standard and having on one end a pulley wheel 38 adapted to receive a belt from a source of power and on the other end a miter gear 39 meshing with a miter gear 40 secured to and operating the driving shaft of the dasher and a miter gear 41 secured to the cover 42 of the freezer which is in turn secured to the can in the well known manner.

I do not wish to be understood as limiting myself to the precise details and arrangements of parts shown and described, but reserve the right to all modifications within the scope of my invention.

Having now described my invention what I claim as new and desire to secure by Letters Patents, is

1. In a dasher for liquid freezers, a stem having inclined blades adapted to force the material in one direction adjacent the walls of the freezer and a continuous spiral conveyer separate from the blades and extending around the stem between said blades, said conveyer being adapted to force the material, in the center of the freezer, in the opposite direction to that given it by the blades, substantially as described.

2. In a dasher for liquid freezers, a stem having inclined blades adapted to force the material in one direction adjacent the walls of the freezer and a continuous spiral conveyer separate from the blades and extending around the stem between said blades, the portions thereof between the blades being inclined in the opposite direction to the blades between which they extend.

3. In a dasher for liquid freezers, a scraper blade pivoted on its lower end and having a rearwardly extending supporting foot, substantially as described.

Signed at New York, in the county of New York, and State of New York, this 7th day of September, A. D. 1906.

GEORGE M. MILLS.

Witnesses:
 A. R. APPLEMAN,
 A. B. BLACKWOOD.